United States Patent
Prickett et al.

(10) Patent No.: US 10,432,407 B2
(45) Date of Patent: Oct. 1, 2019

(54) SECURE PROVISIONING OF UNIQUE TIME-LIMITED CERTIFICATES TO VIRTUAL APPLICATION INSTANCES IN DYNAMIC AND ELASTIC SYSTEMS

(71) Applicant: ARRIS Enterprises LLC, Suwanee, GA (US)

(72) Inventors: David B. Prickett, San Diego, CA (US); Alexander Medvinsky, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 151 days.

(21) Appl. No.: 15/384,256

(22) Filed: Dec. 19, 2016

(65) Prior Publication Data
US 2018/0176023 A1    Jun. 21, 2018

(51) Int. Cl.
| | |
|---|---|
| H04L 9/32 | (2006.01) |
| H04L 9/08 | (2006.01) |
| G06F 21/60 | (2013.01) |
| H04L 9/06 | (2006.01) |
| G06F 21/12 | (2013.01) |
| G06F 21/51 | (2013.01) |
| G06F 21/57 | (2013.01) |

(52) U.S. Cl.
CPC .......... *H04L 9/3268* (2013.01); *G06F 21/12* (2013.01); *G06F 21/51* (2013.01); *G06F 21/57* (2013.01); *G06F 21/602* (2013.01); *H04L 9/0631* (2013.01); *H04L 9/0822* (2013.01)

(58) Field of Classification Search
CPC ...................................................... G06F 21/51
See application file for complete search history.

(56) References Cited

U.S. PATENT DOCUMENTS

| | | | |
|---|---|---|---|
| 6,108,788 A * | 8/2000 | Moses | G06F 21/602 713/155 |
| 10,069,914 B1 * | 9/2018 | Smith | H04L 67/1097 |
| 2004/0165725 A1 * | 8/2004 | Kumar | G06F 21/602 380/202 |
| 2011/0138177 A1 * | 6/2011 | Qiu | H04L 9/006 713/168 |

(Continued)

FOREIGN PATENT DOCUMENTS

WO    2015/143651 A1    10/2015

OTHER PUBLICATIONS

PCT International Search Report & Written Opinion, RE: Application No. PCT/US2017/064727, dated Mar. 14, 2018.

(Continued)

*Primary Examiner* — Benjamin E Lanier
(74) *Attorney, Agent, or Firm* — Thomas A. Ward

(57) ABSTRACT

A method is provided for automatically provisioning unique X.509 Certificates and Private Keys into Application Instances in a dynamic and elastic cloud environment. The method provides a means of creating a secure identity to be used for secure communications and resource allocation. Security of the provisioning is guaranteed by the fact that a trusted and hardened Orchestrator is launching the application instance and then directly provisioning the certificate and key. As an additional security measure, the certificates will have a limited time of validity, in order to decrease the impact of an incorrectly-issued certificate.

14 Claims, 11 Drawing Sheets

(56) References Cited

U.S. PATENT DOCUMENTS

| | | | | |
|---|---|---|---|---|
| 2012/0084184 A1* | 4/2012 | Raleigh | .............. | H04L 12/5691 |
| | | | | 705/30 |
| 2013/0275969 A1* | 10/2013 | Dimitrov | .................. | G06F 8/61 |
| | | | | 718/1 |
| 2014/0282821 A1* | 9/2014 | Adler | ...................... | H04L 63/10 |
| | | | | 726/1 |
| 2014/0380058 A1* | 12/2014 | Agarwal | ................. | H04L 9/083 |
| | | | | 713/176 |
| 2015/0121078 A1* | 4/2015 | Fu | ........................... | G06F 21/30 |
| | | | | 713/175 |
| 2016/0292676 A1* | 10/2016 | French | ................. | G06Q 20/322 |
| 2017/0093805 A1* | 3/2017 | Proulx | ................. | H04L 9/0822 |

OTHER PUBLICATIONS

"Network Functions Virtualisation (NFV)", NFV Security; Security and Trust Guidance; Draft ETSI GS NFV-SEC 003 European Telecommunications Standards Institute (ETSI), vol. ISG-NFV No. V1.1.1, Nov. 24, 2014.

J. Schaad, et al., "Certificate Management over CMS (CMC)", Network Working Group, Request for Comments: 5272, Jun. 2008, 83 pgs.

"Network Functions Virtualisation (NFV); NFV Security; Security and Trust Guidance", ETSI GS NFV-SEC 003 V1.1.1, Dec. 2014, 57 pgs.

* cited by examiner

SECURE PROVISIONING OF UNIQUE TIME-LIMITED CERTIFICATES TO VIRTUAL APPLICATION INSTANCES IN DYNAMIC AND ELASTIC SYSTEMS

BACKGROUND

1. Field of the Invention

The present invention relates to systems and methods for secure execution of computer applications, and in particular to a system and method for secure execution of computer applications in cloud computing environments.

2. Description of the Related Art

Cloud computing refers to the practice of using a network of remote servers hosted on the Internet to store, manage, and process data, rather than a local server or a personal computer. One of the benefits of cloud computing is the ability to provide shared computer processing resources on demand, this providing access to a shared pool of remotely and rapidly configurable computing resources.

One of the latest innovations in cloud computing is the ability to create application instances in an elastic manner (e.g. application instances are created and destroyed automatically based on stimuli external to the system, with system load conditions typically being a primary driver).

The advent of the use of virtual computing, coupled with the dynamic and elastic nature of newer system architectures, creates a need for a dynamic and automatic method to create and securely manage application instances, particularly when used as part of a systemic authentication and authorization function. In particular, as application instances are created and destroyed based on system load conditions, it is important that they be securely identified and managed in order to support secure communications and securely authorize resource allocation among the application instances and other elements.

However, the transient existence of these application instances presents a challenge in controlling the application instance's access to secure system resources and sensitive information. What are needed are systems and methods for securely executing such instances in a reconfigurable processing architecture using cloud computing techniques. This document describes such systems and methods.

SUMMARY

To address the requirements described above, the present invention discloses a method, apparatus, article of manufacture, and a memory structure for executing an application instance on a first processor. In one embodiment, the method comprises accepting a request in an orchestrator executing on a second processor to launch the application instance in the first processor, transmitting a command from the orchestrator to the first processor to launch the application instance, and provisioning a certificate and a private key from the orchestrator to the launched application instance executing on the second processor, the certificate and private key securing protected information of the application instance, wherein the private key is encrypted according to a key encryption key securely stored in an application image of the application instance, wherein the first processor decrypts the private key according to the key encryption key and re-encrypts the private key according to a local storage key. In a related embodiment, the method comprises accepting a request in an orchestrator executing on a second processor to launch the application instance in the first processor, transmitting a command from the orchestrator to the first processor to launch the application instance, and provisioning a certificate and a private key from the orchestrator to the launched application instance executing on the first processor, the certificate and private key securing protected information of the application instance, wherein the private key is encrypted according to a local storage key derived by the second processor, wherein the first processor derives the local storage key independently from the second processor at least in part by using a key encryption key securely stored in an application image of the application instance and decrypts the private key according to the local storage key.

Another embodiment is evidenced by a system for enabling execution of an application instance on a first processor, the application instance having information encrypted according to a private key. The system comprise an orchestrator, executing on a second processor having a second processor memory, the second processor memory having second processor instructions wherein the second processor comprises instructions for accepting a request to launch the application instance, for transmitting a command to the first processor to launch the application instance; and for directly provisioning a certificate and the private key to the launched application instance executing on the second processor, wherein the provisioned private key is encrypted according to a key encryption key securely stored in the application image. In a related embodiment, the system comprises an orchestrator, executing on a second processor having a second processor memory, the second processor memory having second processor instructions comprising instructions for accepting a request to launch the application instance, transmitting a command to the first processor to launch the application instance, and provisioning a certificate and a private key from the orchestrator to the launched application instance executing on the first processor, the certificate and private key securing protected information of the application instance, wherein the private key is encrypted according to a local storage key derived by the second processor. In this embodiment, the first processor derives the local storage key independently from the first processor at least in part by using a key encryption key securely stored in an application image of the application instance and decrypts the private key according to the local storage key.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

In a dynamic and/or elastic computing environment, client authorization is needed to prevent malicious use of available resources, mistaken or unauthorized use of available resources, and/or attacks on customer systems via malicious clients that gain access to system via open environment.

External threats include denial of service attacks. For example, rogue clients could (1) overload the other systems that provide resources by creating many requests for resources; (2) remove system capacity by taking memory, CPU, available storage; and/or (3) remove system capability by reserving all licenses. External threats also include theft of content, theft of subscriber information, and/or unauthorized access.

Resources at risk include CPU cycles, memory, storage, IP addresses, network access, licenses, and proprietary information such as digital video content, and subscriber information.

The foregoing challenges are met by providing a system and method for each application instance to be uniquely and securely identified, and to create limits of certificate validity to reduce exposure to incorrectly issued certificates. This is accomplished by distributing a unique X.509 certificate/private key pair to each new application instance, via a trusted entity herein described as an orchestrator. The orchestrator is used as a vector for certificate/private key installation at the time of application instance deployment. In one embodiment, certificates are obtained by the orchestrator from a certificate manager (CM) that can be separate from the orchestrator and hardened as required.

One example of this type of certificate issuance is described in "Network Functions Virtualization (NFV); NFV Security; Security and Trust Guidance, Security and Trust Guidance for Network Function Virtualization Security, section 4.4.3.," ETSI GS NFV-SEC 003 v1.1.1 (2014-12), which is hereby incorporated by reference herein.

As this method of certificate distribution may be automated, the time of validity for certificates may be limited to allow the system operator to mitigate the effects of mistaken certificate issuance.

System Architecture

Figure 1:
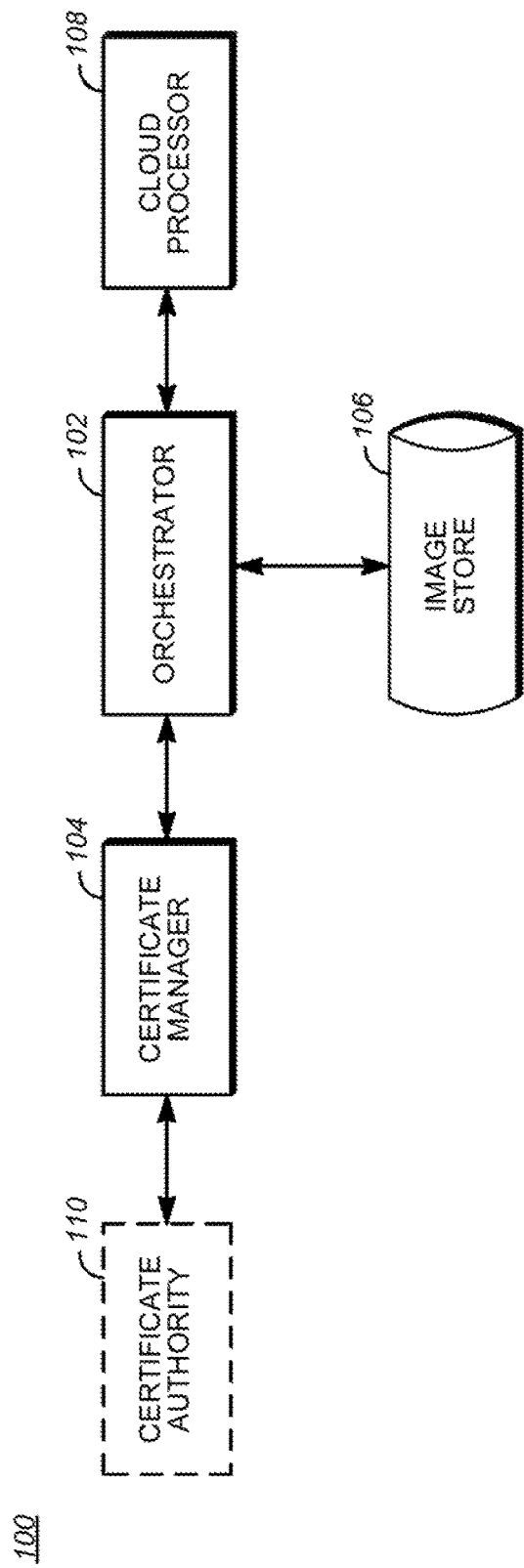
FIG. 1 is a diagram depicting a system architecture of a distributed processing environment.

FIG. 1 is a diagram depicting a system architecture of a distributed processing environment (DPE) 100. The DPE 100 comprises an orchestrator 102, a certificate manager (CM) 104, an application image store 106 and a cloud processor 108. In one embodiment, the DPE 100 also comprises an optional certificate authority (CA) 110, as further described below.

The orchestrator 102 is an automated service that supports the arrangement, coordination, and management of complex computer systems and services, and performs the functions described below. Examples of orchestrator implementations include a VMWare Orchestrator and an Open Stack Heat. The VMWare Orchestrator is a suite of VMware vCloud suite components that adapt and extend service delivery and operational management of the applications, effectively working with existing infrastructure, tools, and processes. The VMWare Orchestrator simplifies the automation of complex IT tasks and integrates with the VMWare vCloud Suite components.

The CM 104 is a service that supports generation and/or distribution of certificates. In one embodiment, the certificates are X.509 certificates that are distributed via certificate management over CMS (CMC), as described in "Certificate Management over CMS (CMC)," RFC 5272, June 2008, which is hereby incorporated by reference herein. The CM 104 may act as a CA 110, a proxy to a CA 110, or a storage and/or distribution point for certificates previously issued by a CA 110. The CM 104 also supports issuance of certificates based on the usage of the certificate (e.g. which operations or data access is to be authorized), as defined by the orchestrator 102.

In order to protect private keys associated with the generated certificates, the CM 104 uses application-specific key encryption keys (KEKs 206) to encrypt the private keys before their transmission to the cloud processor 108 for local storage. The application-specific KEK 206 provided to the cloud processor 108 by being securely stored as a part of the application image, thus allowing the application to decrypt it for use.

The image store 106 is a service that is used to store application images, and which supports an interface that can be used to request those images for a launch of an application.

In one embodiment, the following overall prerequisites apply to the elements of the DPE 100:

- The orchestrator 102 is security hardened, and is trusted by the image store 106 and the CM 104
- The orchestrator 102 is pre-provisioned with a certificate that is used for purposes of authorization with the image store 106 and the CM 104.
- The CM 104 and image store 104 are trusted by the orchestrator 102.
- The orchestrator 102 can provision certificate/key pairs to new application instances.
- The orchestrator 102 can request and receive certificates from the CM 104.
- An application-specific key encryption key (KEK 206) is securely stored in each application image that is available from the image store 106.

Certificate Generation and Construction

As described further below, certificates and private key pairs used for new application instances can be generated in any of the following ways:

- On-demand generation by a CA 110 external to the DPE 100.
- On-demand generation by the CM 104 acting as a CA 110.
- A-priori generation of certificates from a CA 110, using a manual transfer method to load the certificates into a pool on the CM 104.

Certificate/Private Key pair generation is based on templates created and stored on the Orchestrator 102. The templates will define at least (1) certificate usage and (2) validity period. Certificate usage refers to how the certificate will be used. Such usages include encryption, decryption, or authentication via certificate signature. Validity period refers to the period for which the certificate is valid. This may be described in terms of time or in terms of the number of uses.

Identification

One important purpose of the certificate provided by the CM 104 is to allow secure identification of each new application instance. Once established, this secure identification can be used for authentication and authorization.

In scenarios where the DPE 100 contains or has access to an on-demand CA 110, a potential identifier for these systems would be a system identifier such as a Universally Unique Identifier (UUID) that is assigned to each new application instance at launch. Based on the way that the UUID is utilized in virtualized systems, it must be unique within each DPE 100 domain—so it would serve as the unique anchor needed to support further authentication and authorization of the application instance as it communicates with other system elements.

In scenarios where the DPE 100 does not contain an on-demand CA 110, unique identifiers must be generated by the external CA 110.

Usage

The certificate can further be used as a basis for secure communications, like SSL or TLS, or to encrypt or decrypt protected information. This usage will be defined by a system administrator as part of the provisioning of a new application type, and will then be used in a template for certificate requests and for certificate generation.

Validity Period

Each certificate may have a validity period, defined by 'valid from' and valid to' dates contained within the certificate. In order to support the security for the potentially short-lived application instances in dynamic and elastic Systems, the validity period may be limited for most, if not all issued certificates.

Determining what the certificate validity period may be based on whether the application was the first instance of the Application type to be launched, or a subsequent instance as follows:

Initial application instance—In an exemplary embodiment, initial Application instances are long-lived, weeks or years of validity. This is based on the notion that at least one instance of the application is necessary to support the ongoing functionality of the system that it is part of Based on this notion, the initial application instance is also not as likely to be destroyed based on changes in system conditions such as a reduction in load.

Subsequent application instances—In the foregoing exemplary embodiment, application instances created after the initial application instance are provisioned with certificates that have a relatively short validity period—hours or days. This is based on the notion that these application instances are created in response to heavier load on a system, and would then be destroyed when the load was alleviated.

Pre-generation of Certificate/Private Key Pair

In order to support systems that do not either contain or have access to an on-demand CA 110, certificate/private key pairs may be pre-generated. In this case, the certificate templates that are created by a systems administrator as part of the provisioning of a new application instance type would be used to generate a 'pool' of certificates, which are then loaded manually to the CM 104. This certificate "pool" includes certificates of varying validity periods, in order to support the capability for the CM 104 to issue certificates with limited validity periods. The system administrator or other entity may be responsible for periodically refilling the Certificate Pool with valid certificates. Alternatively, an automated process may be used to request new certificates of each duration whenever their volume is below a specified threshold.

Protection of Private Keys

In order to protect the private key in transit to the new application image, and to assure that only a trusted application image may use the Private Key, an application type-specific key encryption key (KEK 206) is be used. In this context, an application "type" refers to a particular application as opposed to instances of that application. For example, if an application is referred to as "DAC," there is a unique KEK 206 that is the same for all instances of "DAC," but for another application (for example, a code downloader) it would have another value for the KEK 206 for all instances of the code downloader. The derivation and use of an key that is specific to each application instance (the LSK 308) is described. A KEK 206 for each type of Application that the Orchestrator 102 supports is generated and securely stored in the CM 104 prior to any launch of a new application instance. The application type-specific KEK 206 will be securely stored as part of the application image, and the application image is preferably signed by a private key (where the corresponding code verification public key is known to the orchestrator 102) and stored in the Image Store 106.

Storage on the Certificate Manager

After having retrieved or generated the certificate/private key pair, the CM 104 encrypts the private key with the application type-specific KEK 206 prior to storage local to the CM 104.

Figure 2:
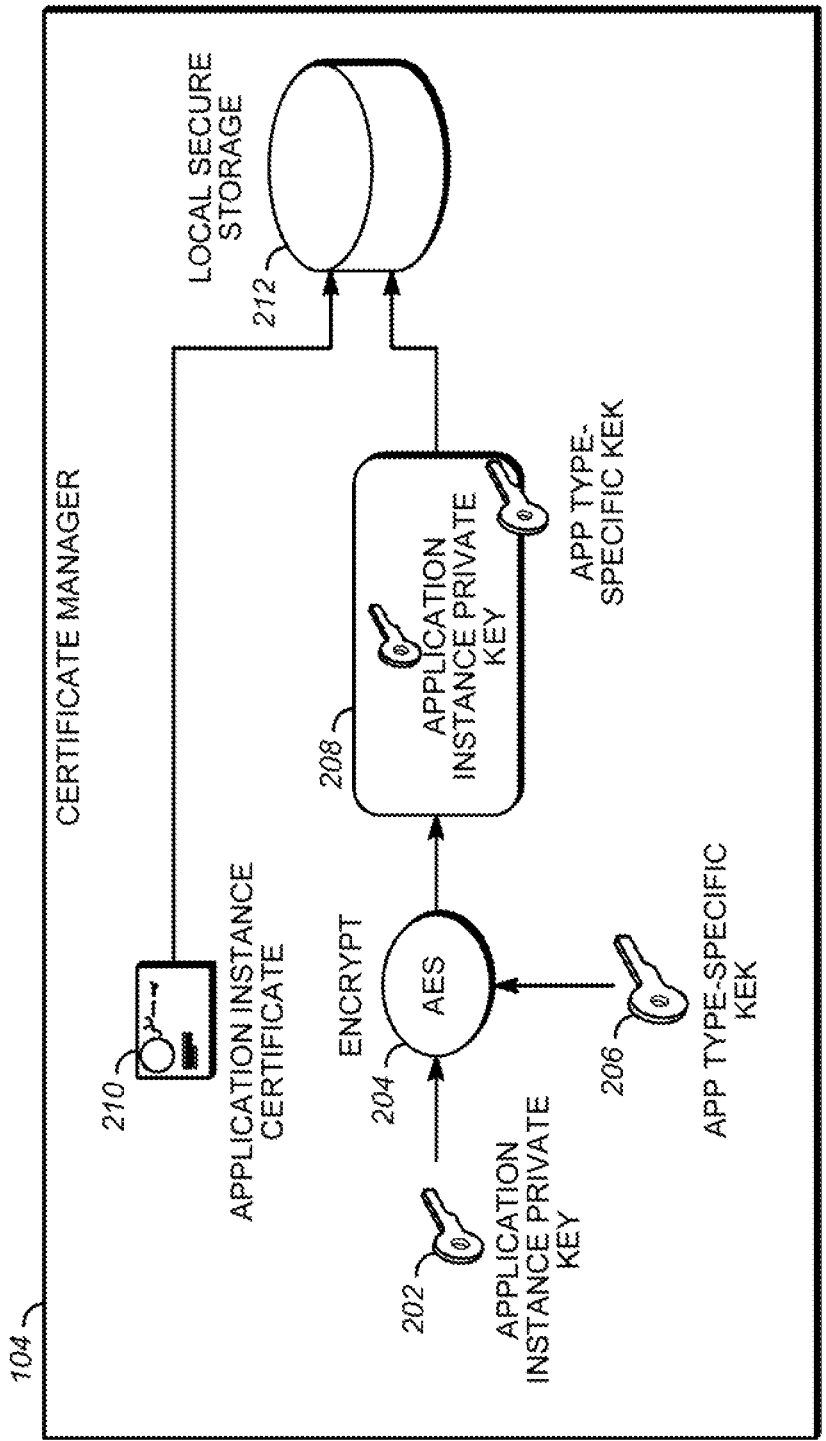
FIG. 2 is a diagram illustrating one embodiment of private key storage on the certificate manger of the distributed processing environment.

FIG. 2 is a diagram illustrating one embodiment of private key storage on the CM 104. As illustrated, the application instance private key 202 is encrypted by encryption operation 204 according to the application-type specific KEK 206 to produce an encrypted application instance private key 208. That encrypted application instance private key 208 is stored in storage 212 local to the CM 104. In one embodiment, the encryption operation 204 is an advanced encryption standard (AES) encryption operation performed by an encryptor.

Local Storage Key Derivation

As part of initialization, and after having received the certificate 210 and encrypted private key 208, the new application instance will (1) use the KEK 206 to decrypt the encrypted private key 208, (2) derive a local storage key (LSK 308), (3) encrypt the (now decrypted) private key 202 with the LSK 308, and (4) store the re-encrypted private key for later use. In one embodiment, the LSK 308 is derived for each use of the stored private key. Since elastic application instance are often created and each has a new UUID, it is unnecessary to manage a secure database of LSK 308s.

Figure 3:
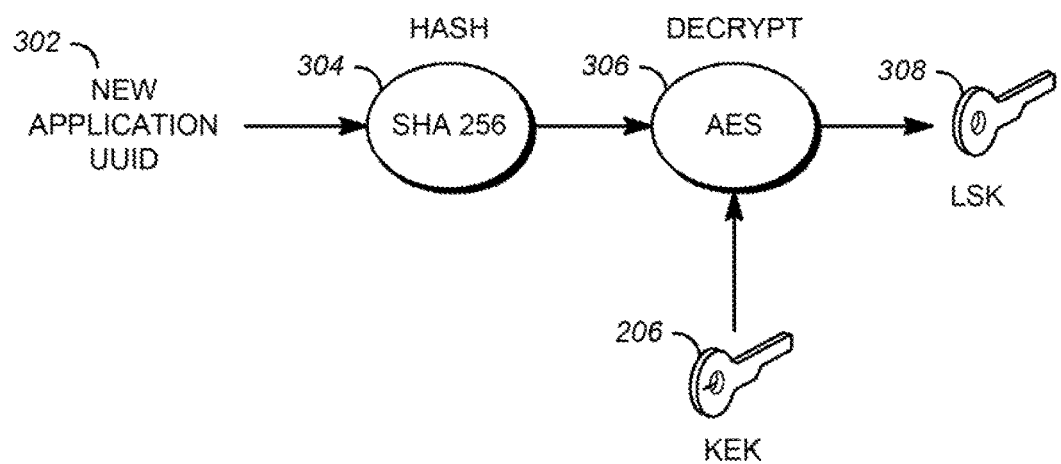
FIG. 3 is a diagram depicting one embodiment of how the local storage key may be derived by the new application instance.

FIG. 3 is a diagram depicting one embodiment of how the local storage key 302 may be derived by the new application instance. In the illustrated embodiment, the UUID 302 for a the new application instance is accessed, and hashed by hashing operation 304. The hashing operation may accomplished via a secure hashing algorithm (SHA256), which is a cryptographic hash function that produces a hash value known as a message digest. The hashed UUID 302 is then decrypted according to the KEK 206 via a decrypt operation 306. In the illustrated embodiment, the decrypt operation is an operation compliant with the advanced encryption standard (AES), which is described in the document "Announcing the ADVANCED ENCRYPTION STANDARD (AES)," Federal Information Processing Standards Publication 197, published by United States National Institute of Standards and Technology (NIST). Nov. 26, 2001, which is hereby incorporated by reference herein. The result is the local storage key 308.

Storage on New Application Instance

Figure 4:
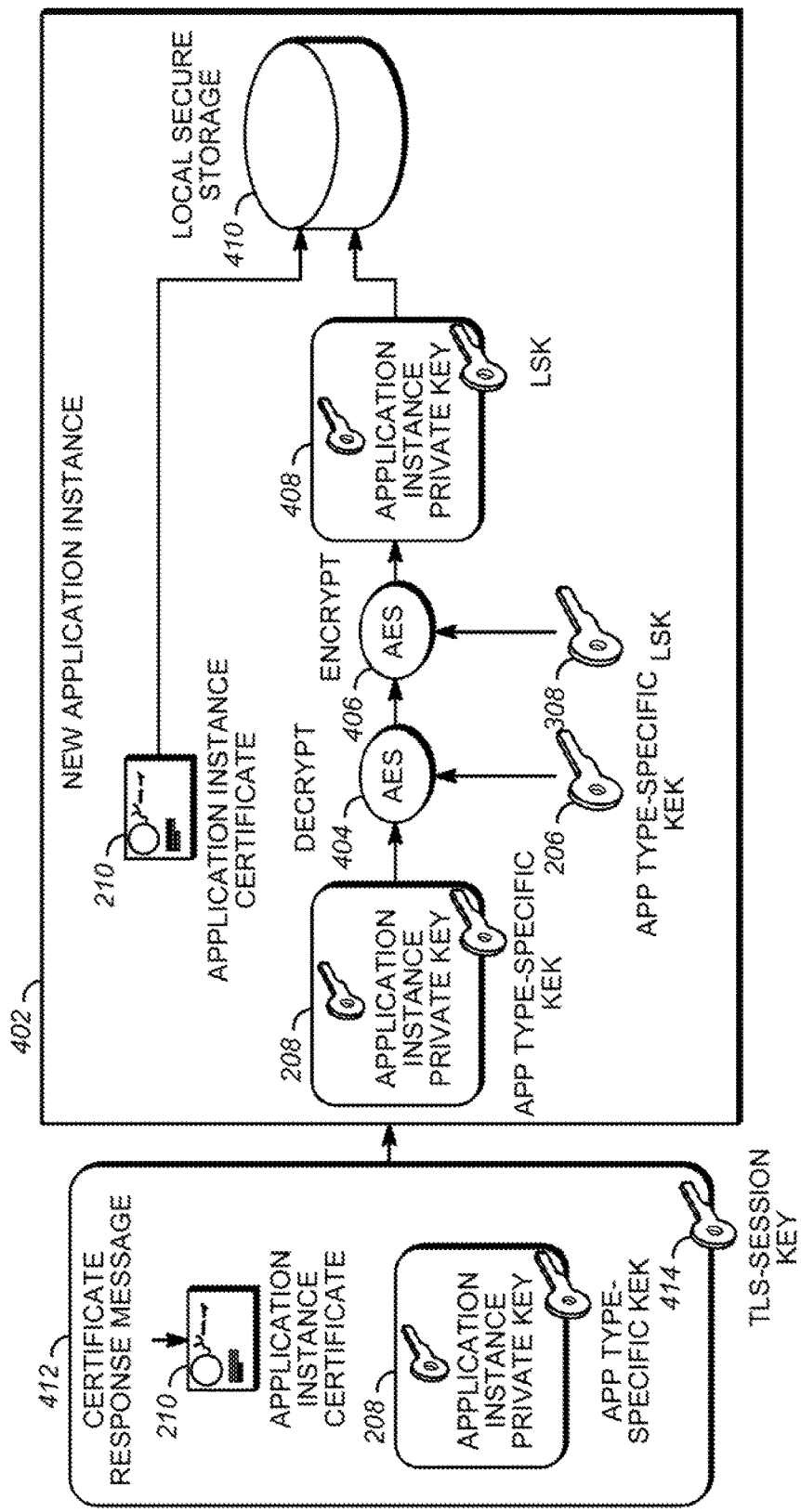
FIG. 4 is a diagram illustrating one embodiment of how the private key may be decrypted and re-encrypted prior to storage on the cloud processor for use by the application instance.

FIG. 4 is a diagram illustrating one embodiment of how the private key may be decrypted and re-encrypted prior to storage on the cloud processor 108 for use by the application instance 402. A certificate response message 412 from the orchestrator 102 is received by the new application instance 402 executing on the cloud processor 108. In one embodiment the certificate response message 412 is protected at the transport layer level, for example, by encryption according to a transport layers security TLS session key 414. In this embodiment, the certificate response message is decrypted by the cloud processor 108 using an associated TLS session key. The encrypted (according to the application-type specific KEK 206) application instance private key 208 is decrypted by decrypt operation 404 using the application-type specific KEK 206 to produce a clear version of the application instance private key 202. The application instance private key 202 is then encrypted by encryption operation 406 according to the LSK 308 308 and stored in storage 410 local to the new application instance 402. The application instance certificate 210 is also stored on such local storage 410.

FIGS. 5A-5D are diagrams illustrating exemplary embodiments illustrating the techniques for provisioning certificates to virtual application instances in dynamic and elastic systems. FIGS. 5A-5D are also discussed with reference to FIGS. 6 and 7, which illustrate further details of selected embodiments.

As described above, in selected embodiments, the process begin with the pre-generation of application instance certificates 210. This can be accomplished by a system administrator or analogous entity submitting a template for certificate generation, to a certification authority 110. The certification authority 110 verifies the signature of the system administrator and authorizes generation of the application instance certificates 210. The CA 110 then generates pairs of certificates 412 and application instance private keys 208, and provides them to the system administrator. The system administrator may then copy the certificates to removable media for storage.

Figure 5A:
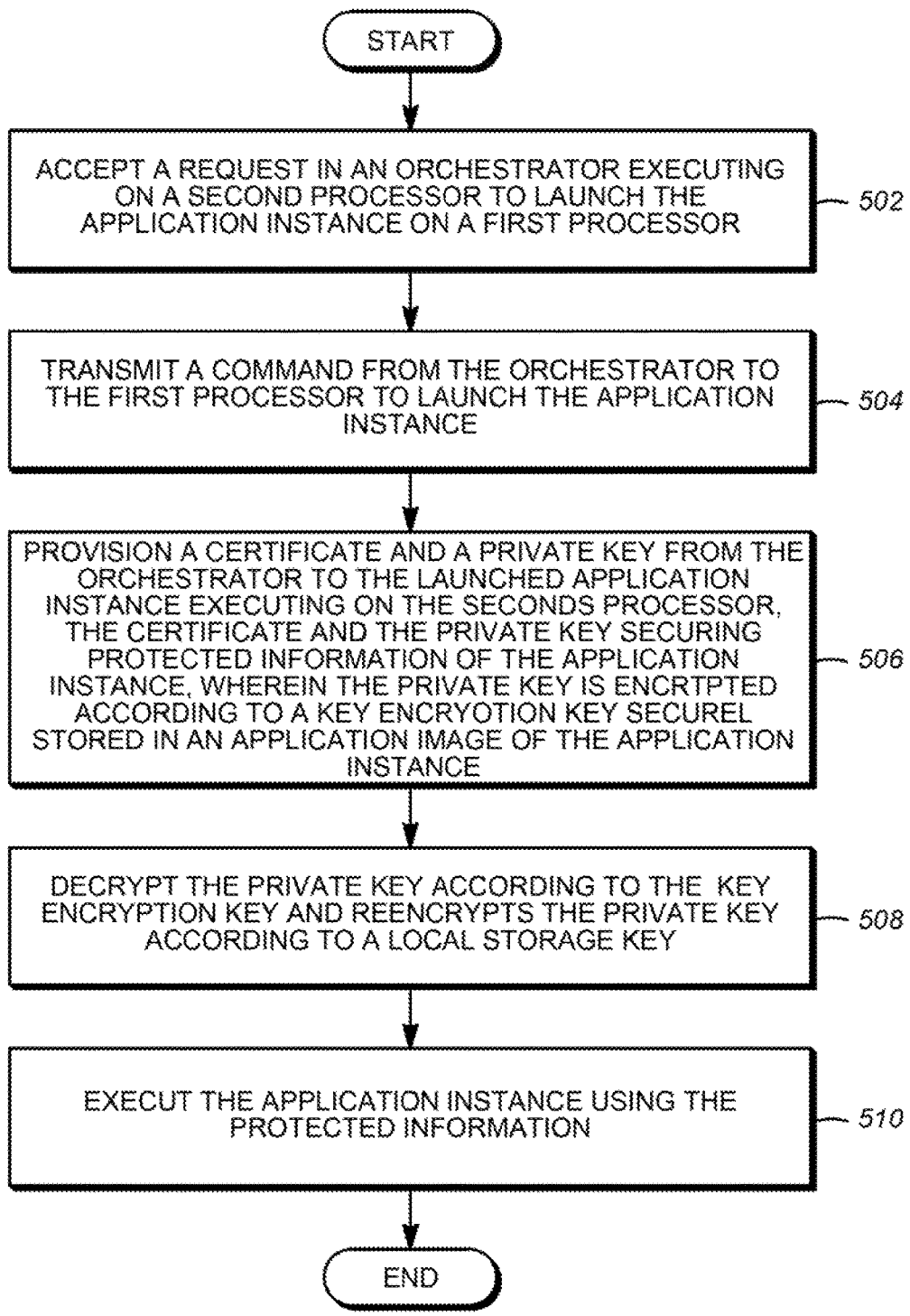
FIGS. 5A-5D are diagrams illustrating exemplary embodiments illustrating the techniques for provisioning certificates to virtual application instances in dynamic and elastic systems.

FIG. 5A is a diagram illustrating the secure provisioning of certificates to virtual application instances. In block 502, a request to launch an application instance 402 in a first processor is accepted in the orchestrator 102. This is also illustrated in step 1 of FIG. 6, which is a diagram illustrating exemplary operations for certificate distribution when the CM 104 acts as a CA 110. In step 1, the orchestrator 102 is triggered to generate a new instance of an application.

In block 504, a command is transmitted from the orchestrator to the first processor to launch the application instance 402. As shown in step 1 of FIG. 6, this may be accomplished by the orchestrator initiating a 2-way TLS session with the image store 106, using a orchestrator certificate (which may be pre-provisioned), allowing the orchestrator 102 to verify that the image store 106 is trusted. At the same time, the certificate used to initiate the TLS session allows the image store 106 to verify that the orchestrator 102 is trusted. In step 2, the orchestrator 102 then transmits an image request for the application image 402 necessary to launch the requested application instance, the image store 106 retrieves the requested application image, and transmits a signed version of the requested application image 402 to the orchestrator 102. In step 3, the image is retrieved and transmitted to the orchestrator 102. In step 4, the orchestrator 102 uses the signature associated with the requested application image 402 and a pre-configured code verification public key to verify that the image is from the trusted source. In step 5, the orchestrator transmits the application image 402 to the cloud processor 108 and commands that the cloud processor 108 launch the application image, thereby creating a new application instance 402.

Returning to FIG. 5A, in block 506 the orchestrator 102 directly provisions a certificate and a private key to the launched application instance 402 executing on the cloud processor 108. The certificate 210 and the private key 208 secure protected information of the application instance 402. In bock 508, the private key is decrypted according to the KEK 206 and re-encrypted according to the LSK 308. In block In block 510, the application instance 402 is executed using the protected information.

Figure 5B:
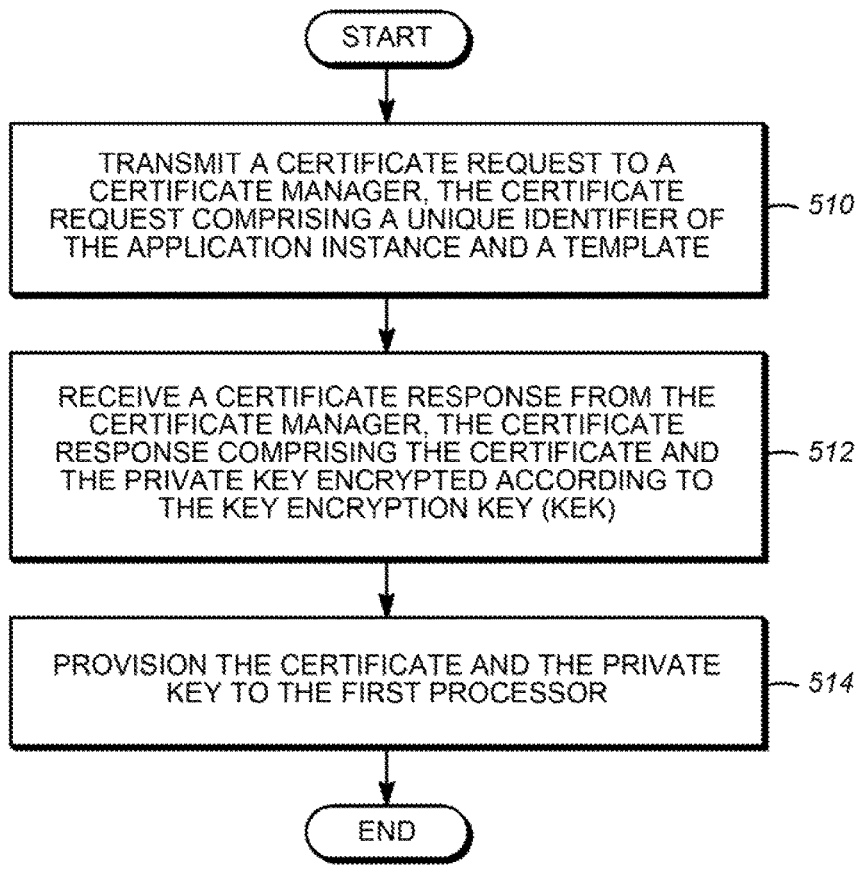

FIG. 5B is a diagram illustrating one embodiment of exemplary operations that can be used to provision a certificate and a private key to the orchestrator 102 so it can later forward the certificate and private key to a newly launched application instance. In block 510, a certificate request is transmitted to the CM 104. The certificate request comprises a unique identifier of the application instance and a template. In block 512, a certificate response is received from the CM 104, the certificate response comprising the requested application instance certificate and the private key encrypted according to a key encryption key (KEK 206). The certificate and private key are then provided to the orchestrator 102 as shown in block 514.

Figure 6:
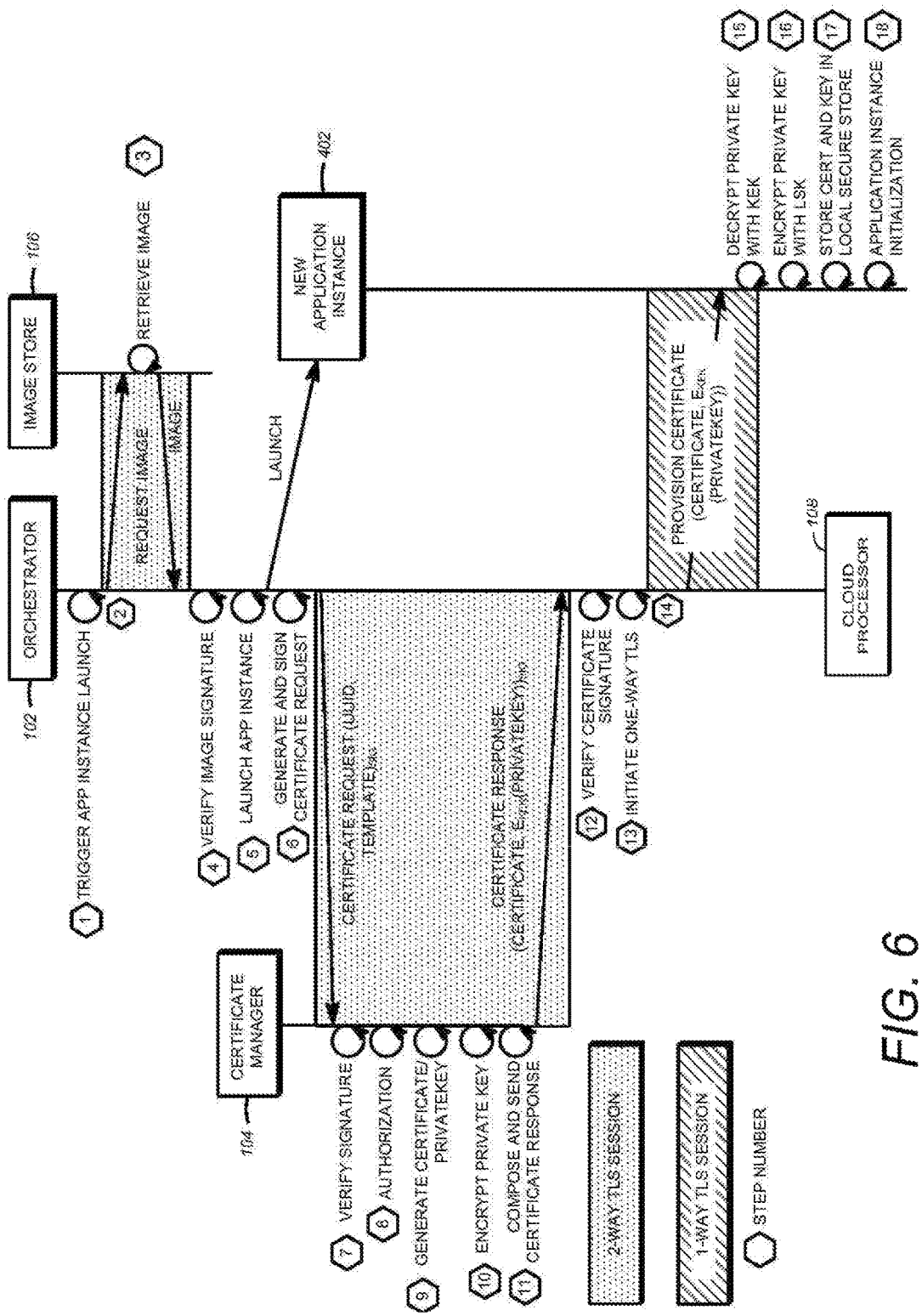
FIG. 6 is a diagram illustrating exemplary operations for certificate distribution when the certificate manager acts as a certificate authority.

In one embodiment, the operations of blocks 510-514 are performed as illustrated by steps 6-14 depicted in FIG. 6. In this case, the application instance is launched automatically, and is then provisioned with a certificate (e.g. X.509) and private key retrieved from the CM 104, which is acting as a CA 110.

In step 6, the orchestrator 102 initiates a 2-way TLS session with the CM 104 using the orchestrator certificate that was pre-provisioned as described above. The certificate used to initiate the TLS session, the CM 104 verifies that the orchestrator 102 is trusted. The orchestrator 102 requests an application instance certificate 210 for the new application instance 402, and signs the request with the pre-provisioned orchestrator certificate. The certificate request includes the UUID 302 assigned to the new application instance at launch, and a template defining usage and optionally, a validity period. This may be accomplished directly or indirectly by use of a certificate profile identifier (ID).

In step 7, the CM 104 verifies that the signature of request was created by a trusted source, in particular, the orchestrator 102. In step 8, the CM 104 verifies that the orchestrator 102 is authorized to provide the application instance certificates 210 using information provided in the certificate request. If the orchestrator 102 is so authorized, the CM 104 generates an application instance certificate 210 and application instance private key 208, using the UUID 302 and template provided with the certificate request, as shown in step 9. The period for which the application instance certificate 210 and application instance private key 208 is valid may be a standard or pre-configured value or it may be based on information that is provided in the request (for example, the template).

In step 10, the CM 104 encrypts the application instance private key 208 with the application-specific KEK 206.

In step 11, the CM 104 signs the new application instance certificate 210 and encrypted private key 208 using TLS session key 414 to compose a certificate response message 412 and transmits the certificate response message 412 to the orchestrator 102.

In step 12, the orchestrator 102 verifies the signature of the new application certificate, and if the signature is verified, the orchestrator 102 initiates a one-way TLS session with the new application instance 402 using the pre-provisioned orchestrator certificate, as shown in step 13. The new application instance 402 trusts the orchestrator 102. In step 14, the orchestrator 102 provisions the new application instance 402 with the certificate (having also the private key encrypted by the KEK 206), and initializes the instance.

In step 15, the application instance 402 executing on the cloud processor 108 receives the certificate 210 and application instance private key 208 encrypted by the KEK 206, and decrypts the private key using the KEK 206. In step 16, the application instance 402 encrypts the application instance private key 208 with the local storage key (LSK 308) 308. In step 17, the certificate 210 and re-encrypted private key 408 is stored in secure storage 410 of the cloud processor 108 accessible to the application instance 108. In step 18, the application instance 402 is initialized, and executed, using the information protected by the application instance private key 208.

Figure 5C:
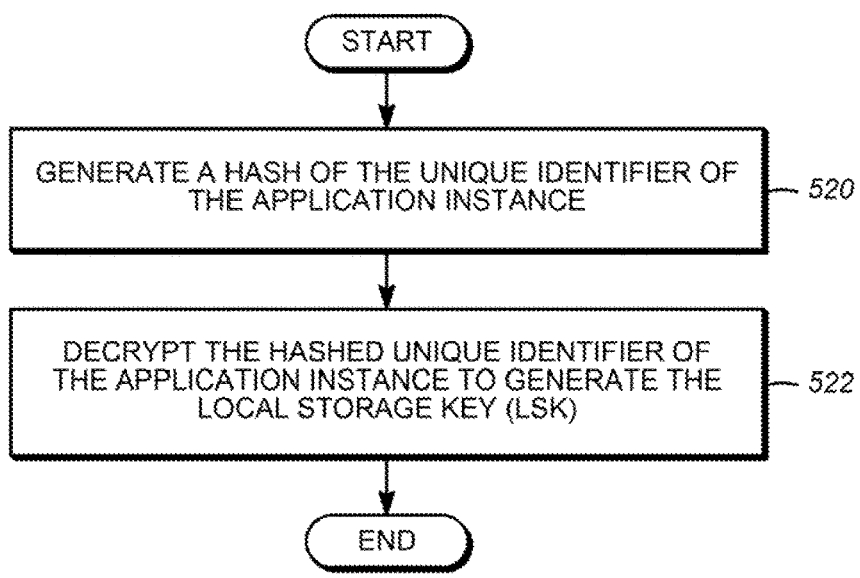

FIG. 5C is a diagram illustrating one embodiment exemplary operations for generating the LSK 308 308. In block 520, a has of the UUID 302 of the application instance is generated. In block 522, the hashed UUID 302 is decrypted or otherwise cryptographically processed with the KEK 206 to generate the LSK 308 308.

In the aforementioned embodiment, the CM 104 a KEK 206-encrypted version of the private key to the application instance 402, where it is decrypted, and using a locally generated LSK 308 308 derived from the KEK 206 and UUID 302, re-encrypted and stored in secure memory. In another embodiment, since the CM 104 knows the KEK 206 and UUID 302, the CM 104 derives the LSK 308 and in step 10 of FIG. 6, encrypts the private key 202 with the instance-specific LSK 308 (and not the KEK 206) before transmission to the application instance 402. In this embodiment, steps 15 and 16 of FIG. 6 are unnecessary and are eliminated, and when the private key is needed, the application instance 402 retrieves the LSK 308-encrypted private key 202, derives the LSK 308 using the UUID 302 and KEK 206 as shown in FIG. 3, and uses the LSK 308 to decrypt the retrieved private key 202 for use. In a still further embodiment, in step 10 of FIG. 6, the CM 104 encrypts the private key 202 with the LSK 308 and then the KEK 206 before its transmission to the application instance 402. In this case, the doubly-encrypted private key 202 is decrypted using the KEK 206, in step 15, but can be stored without further encryption by the application instance 202 for later use. Therefore, step 16 is eliminated in this embodiment.

Figure 5D:
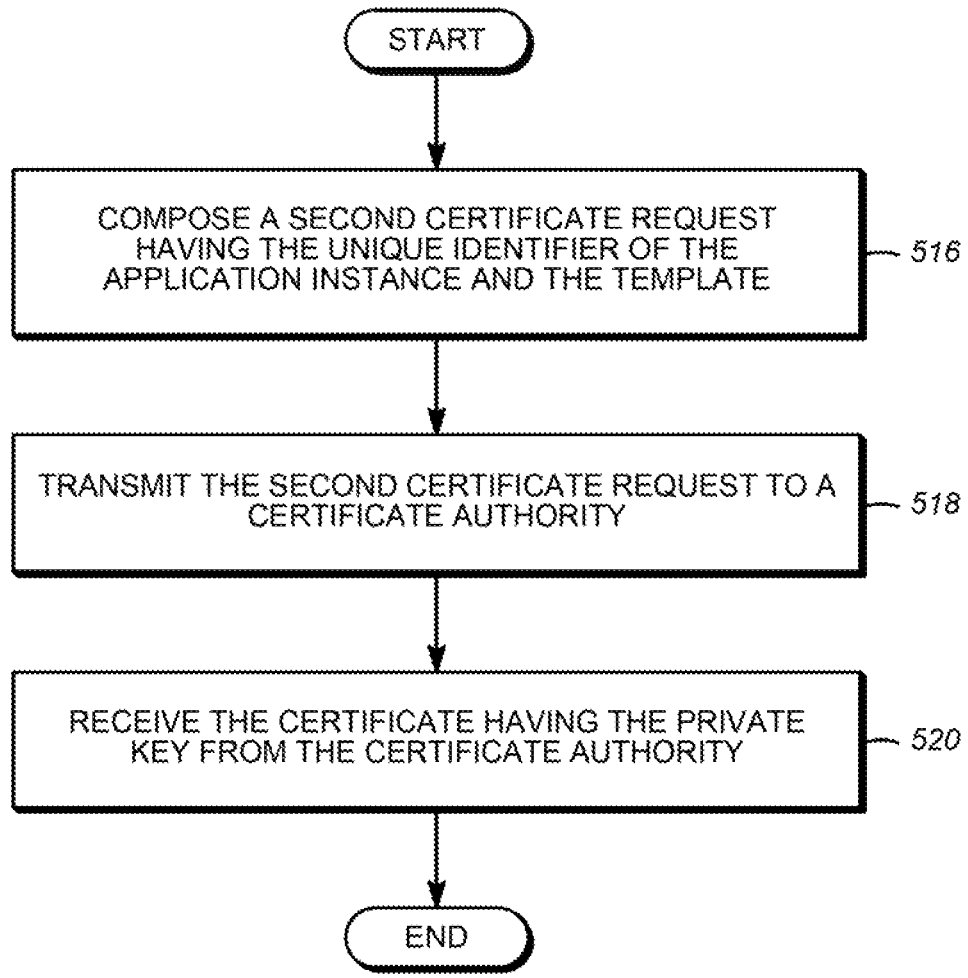

FIG. 5D is a diagram illustrating exemplary operations for certificate distribution using an external (and optionally on-demand) CA 110. In block 516, a second certificate request is composed having the unique identifier (such as the UUID) of the application instance and the template. In block 518, the second certificate request is transmitted to the CA 110. In block 520, the certificate having the private key is received from the CA 110.

Figure 7:
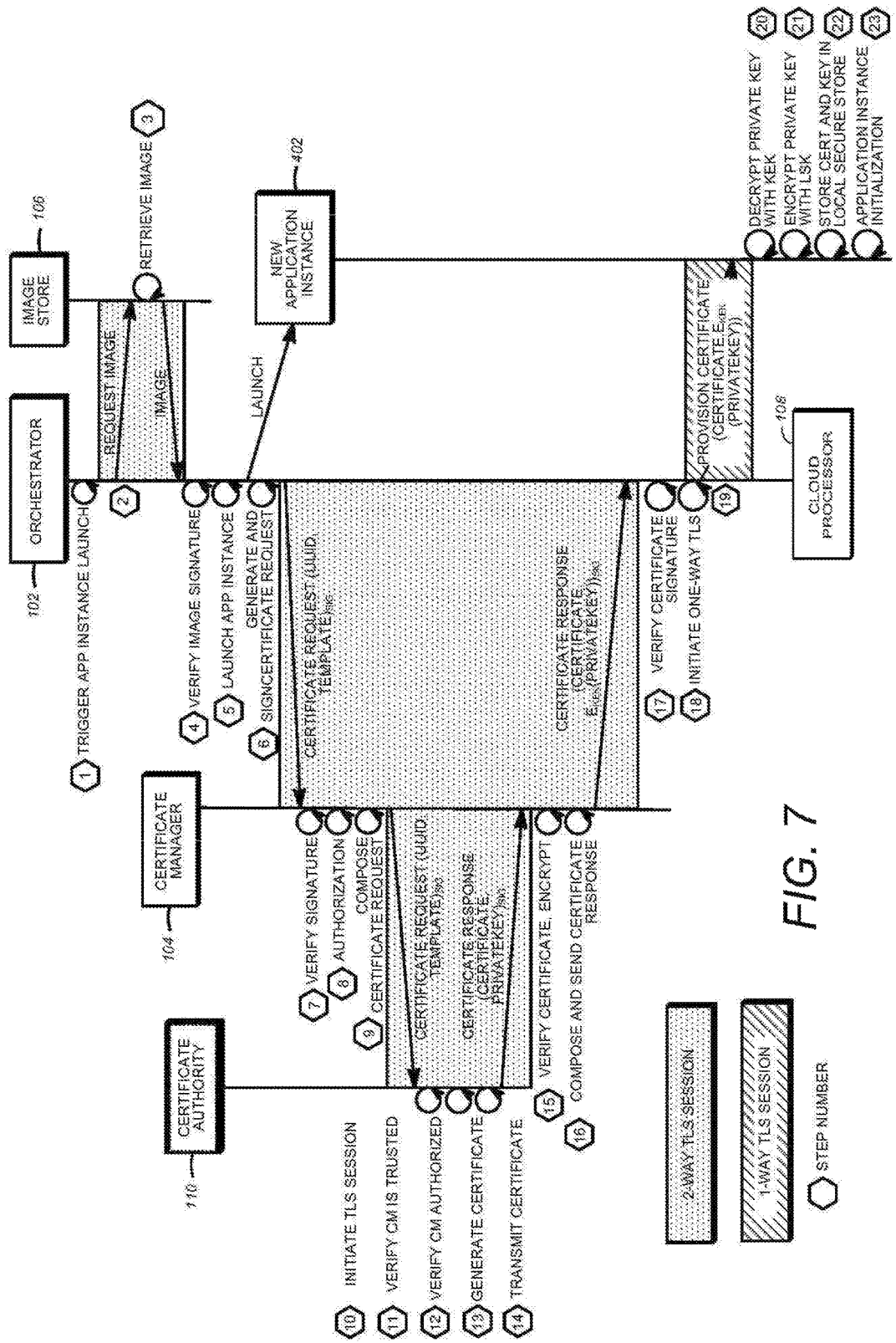
FIG. 7 is a diagram illustrating further detail regarding the exemplary operations for certificate distribution using an external certificate authority.

FIG. 7 is a diagram illustrating further detail regarding the exemplary operations for certificate distribution using an external CA 110. The steps performed in this embodiment are analogous to those depicted in FIG. 6, except the CM 104 obtains the application instance certificate 210 from an external CA 110 instead of generating it within the CM 104. Hence, steps 1-8 and 12-18 of FIG. 6 are analogous to steps 1-8 and 17-23, respectively of FIG. 7.

Specifically, in step 1, the orchestrator 102 is triggered to generate a new instance of an application. This may be accomplished by the orchestrator initiating a 2-way TLS session with the image store 106, using a orchestrator certificate (which may be pre-provisioned), allowing the orchestrator 102 to verify that the image store 106 is trusted. At the same time, the certificate used to initiate the TLS session allows the image store 106 to verify that the orchestrator 102 is trusted. The orchestrator 102 then transmits an image request for the application image 402 necessary to launch the requested application instance, as shown in step 2. In step 3, the image store 106 retrieves the requested application image, and transmits a signed version of the requested application image 402 to the orchestrator 102.

In step 4, the orchestrator 102 uses the signature associated with the requested application image 402 and a pre-configured code verification public key to verify that the image is from the trusted source. In step 5, the orchestrator transmits the application image 402 to the cloud processor 108 and commands that the cloud processor 108 launch the application image, thereby creating a new application instance 402. In step 6, the orchestrator 102 initiates a 2-way TLS session with the CM 104 using the orchestrator certificate that was pre-provisioned as described above. The certificate used to initiate the TLS session, the CM 104 verifies that the orchestrator 102 is trusted.

The orchestrator 102 requests an application instance certificate 210 for the new application instance 402, and signs the request with the pre-provisioned orchestrator certificate. The certificate request includes the UUID 302 assigned to the new application instance at launch, and a template defining usage and optionally, a validity period. This may be accomplished directly or indirectly by use of a certificate profile identifier (ID). In step 7, the CM 104 verifies that the signature of request was created by a trusted source, in particular, the orchestrator 102. In step 8, the CM 104 verifies that the orchestrator 102 is authorized to provide the application instance certificates 210 using information provided in the certificate request.

In step 9, the CM 104 composes and signs a certificate request (to be transmitted to the CA 110) that includes the template and the UUID 302 from the certificate request transmitted from the orchestrator 102. If the validity period was provided by the orchestrator 102 (directly or indirectly), it is forwarded on as a part of the certificate request transmitted to the CA 110. The orchestrator 102 may translate a profile ID into a certificate validity period before generating the certificate request. In step 10, the CM 104 initiates a 2-way TLS session with the CA 110, and using a pre-provisioned certificate manager certificate, verifies that the CA 110 is trusted.

In step 11 the CA 110 verifies that the CM 104 is trusted using the certificate used to initiate the TLS session. In step 12, the CA 110 verifies that the CM 104 is authorized to provide application certificates. In step 13, the CA 110 generates a certificate for the new application instance, using the UUID 302 and the template provided. The time period for which the certificate is valid may be a standard preconfigured value or it may be based on the information provided in the request. In step 14, the CA 110 sends the certificate response having the certificate to the CM 104.

In step 15, the CM verifies the received certificate, encrypts the private key with the application-type specific KEK 206, and sends the result as a certificate response to the orchestrator 102. In step 16, the CM 104 sends the certificate 210 and encrypted private key 208 in a certificate response to the orchestrator 102. In step 17, the orchestrator 102 verifies the signature of the new application certificate, and if the signature is verified, the orchestrator 102 initiates a one-way TLS session with the new application instance 402 using the pre-provisioned orchestrator certificate, as shown in step 18. The new application instance 402 trusts the orchestrator 102. In step 19, the orchestrator 102 provisions the new application instance 402 with the certificate (having also the private key encrypted by the KEK 206), and initializes the instance.

In step 20, the application instance 402 executing on the cloud processor 108 receives the certificate 210 and application instance private key 208 encrypted by the KEK 206, and decrypts the private key using the KEK 206. In step 21, the application instance 402 encrypts the application instance private key 208 with the local storage key (LSK 308) 308. In step 22, the certificate 210 and re-encrypted private key 408 is stored in secure storage 410 of the cloud processor 108 accessible to the application instance 108. In step 23, the application instance 402 is initialized, and executed, using the information protected by the application instance private key 208.

In the aforementioned embodiment, the CM 104 a KEK 206-encrypted version of the private key to the application instance 402, where it is decrypted, and using a locally generated LSK 308 derived from the KEK 206 and UUID 302, re-encrypted and stored in secure memory. In another embodiment, since the CM 104 knows the KEK 206 and UUID 302, the CM 104 derives the LSK 308 and in step 15 of FIG. 7, encrypts the private key 202 with the instance-specific LSK 308 (and not the KEK 206) before transmission to the application instance 402. In this embodiment, steps 20 and 21 of FIG. 7 are unnecessary and are eliminated, and when the private key is needed, the application instance 402 retrieves the LSK 308-encrypted private key 202, derives the LSK 308 using the UUID 302 and KEK 206 as shown in FIG. 3, and uses the LSK 308 to decrypt the retrieved private key 202 for use. In a still further embodiment, in step 15 of FIG. 7, the CM 104 encrypts the private key 202 with the LSK 308 first, and then the KEK 206 before its transmission to the application instance 402. In this case, the doubly-encrypted private key 202 is decrypted using the KEK 206 in step 20 of FIG. 7, but step 21 is eliminated, since the encrypted private key 202 can be stored without further encryption by the application instance 202 for later use.

Figure 8:
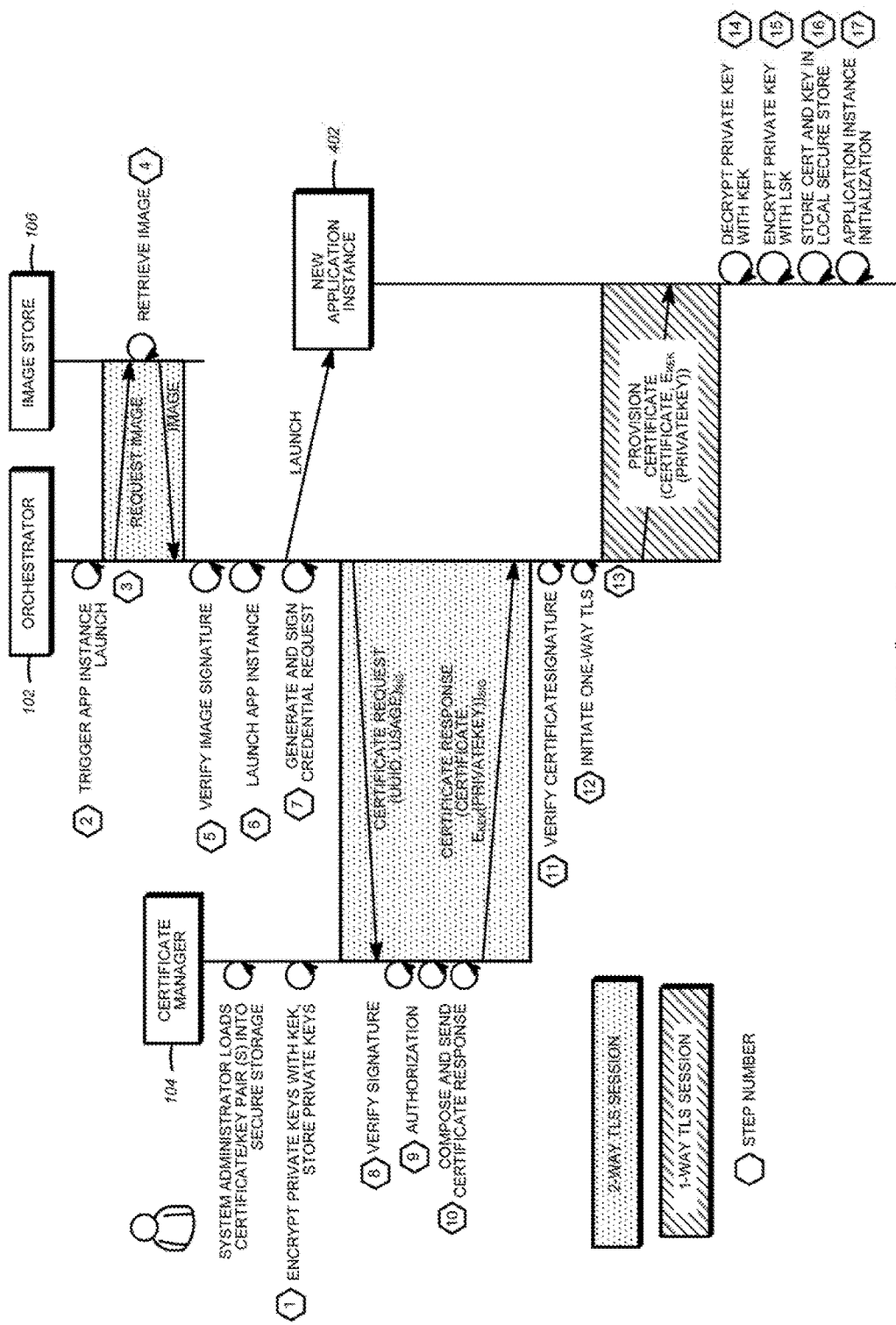
FIG. 8 is a diagram illustrating another embodiment of the certificate distribution

FIG. 8 is a diagram illustrating another embodiment of the certificate distribution. In this case, the application instance 402 is launched automatically, and is then provisioned with a certificate (e.g. X.509) and a private key retrieved from the CM 104. The CM 104 is provided with a pool of certificates which have been pre-generated on a CA 110 and manually transferred to the CM 104. In embodiment the certificate template has been created, an application image is available in the image store 106, the CM 104 has application certificates available for distribution via a pre-generation process discussed further below, and an external stimulus has triggered creation of an application instance.

Pre-generation of application instance certificates can be accomplished by the CA 110 receiving a template from a system administrator to be used for certificate generation. The CA 110 verifies the signature and authorization of the system administrator, and if verified, generates certificate/key pairs based upon the request. The system administrator copies the generated certificates to media for pre-provisioning purposes, and loads the certificate/key pairs into secure storage.

In this embodiment, the first step is for the system administrator to load the pre-generated certificate/key pairs into secure storage accessible to the CM 104, and to encrypt private keys with the KEK 206 and store the encrypted private keys.

Thereafter, steps 2-7 are analogous to steps 1-6 presented in FIG. 6. Specifically, the orchestrator 102 is triggered to generate a new instance of an application. As shown in step 2 of FIG. 8, this may be accomplished by the orchestrator initiating a 2-way TLS session with the image store 106, using a orchestrator certificate (which may be pre-provisioned), allowing the orchestrator 102 to verify that the image store 106 is trusted. At the same time, the certificate used to initiate the TLS session allows the image store 106 to verify that the orchestrator 102 is trusted. In step 3, the orchestrator 102 then transmits an image request for the application image 402 necessary to launch the requested application instance, the image store 106 retrieves the requested application image, and transmits a signed version of the requested application image 402 to the orchestrator 102. In step 4, the image is retrieved and transmitted to the orchestrator.

In step 5, the orchestrator 102 uses the signature associated with the requested application image 402 and a pre-configured code verification public key to verify that the image is from the trusted source. In step 6, the orchestrator transmits the application image 402 to the cloud processor 108 and commands that the cloud processor 108 to launch the application image, thereby creating a new application instance 402. In step 7, the orchestrator 102 initiates a 2-way TLS session with the CM 104 using the orchestrator certificate that was pre-provisioned as described above. The certificate used to initiate the TLS session, the CM 104 verifies that the orchestrator 102 is trusted. In step 7, the orchestrator 102 requests an application instance certificate 210 for the new application instance 402, and signs the request with the pre-provisioned orchestrator certificate. The certificate request includes the UUID 302 assigned to the new application instance at launch, and a template defining usage and optionally, a validity period. This may be accomplished directly or indirectly by use of a certificate profile identifier (ID).

In step 8, the CM 104 verifies that the signature of the certificate request was created by a trusted source. In step 9, the CM 104 verifies that the orchestrator 102 is authorized to provide application certificates. In step 10, the CM 104 retrieves a certificate/private key pair for the new application instance 402 from the pool of pre-generated and stored certificates, then composes a certificate response comprising the retrieved certificate/private key pair, and transmits that certificate response to the orchestrator. In one embodiment, the pre-provisioned certificates include certificates having a specified validity period, and the certificate chosen to be transmitted to the orchestrator 102 is one conforming to the validity period specified in the orchestrator's request.

Thereafter, steps 11-17 are analogous to steps 12-18 described in connection with FIG. 6. Specifically, in step 11, the orchestrator 102 verifies the signature of the new application certificate, and if the signature is verified, the orchestrator 102 initiates a one-way TLS session with the new application instance 402 using the pre-provisioned orchestrator certificate, as shown in step 12. The new application instance 402 trusts the orchestrator 102. In step 13, the orchestrator 102 provisions the new application instance 402 with the certificate (having also the private key encrypted by the KEK 206), and initializes the instance.

In step 14, the application instance 402 executing on the cloud processor 108 receives the certificate 210 and application instance private key 208 encrypted by the KEK 206, and decrypts the private key using the KEK 206. In step 15, the application instance 402 encrypts the application instance private key 208 with the local storage key (LSK 308) 308. In step 16, the certificate 210 and re-encrypted private key 408 is stored in secure storage 410 of the cloud processor 108 accessible to the application instance 108. In step 17, the application instance 402 is initialized, and executed, using the information protected by the application instance private key 208.

In the aforementioned embodiment, the CM 104 a KEK 206-encrypted version of the private key to the application instance 402, where it is decrypted, and using a locally generated LSK 308 derived from the KEK 206 and UUID 302, re-encrypted and stored in secure memory. In another embodiment, since the CM 104 knows the KEK 206 and UUID 302, in step 10 of FIG. 8, the CM 104 derives the LSK 308 and encrypts the private key 202 with the instance-specific LSK 308 (and not the KEK 206) before transmission to the application instance 402. In this embodiment, steps 14 and 15 of FIG. 8 are unnecessary and are eliminated, and when the private key is needed, the application instance 402 retrieves the LSK 308-encrypted private key 202, derives the LSK 308 using the UUID 302 and KEK 206 as shown in FIG. 3, and uses the LSK 308 to decrypt the retrieved private key 202 for use. In a still further embodiment, in step 10 of FIG. 8, the CM 104 encrypts the private key 202 with the LSK 308 and then the KEK 206 before its transmission to the application instance 402. In this case, the doubly-encrypted private key 202 is decrypted using the KEK 206 in step 14 of FIG. 8, but step 15 is eliminated since the encrypted private key 202 can be stored without further encryption by the application instance 202 for later use.

Hardware Environment

Figure 9:
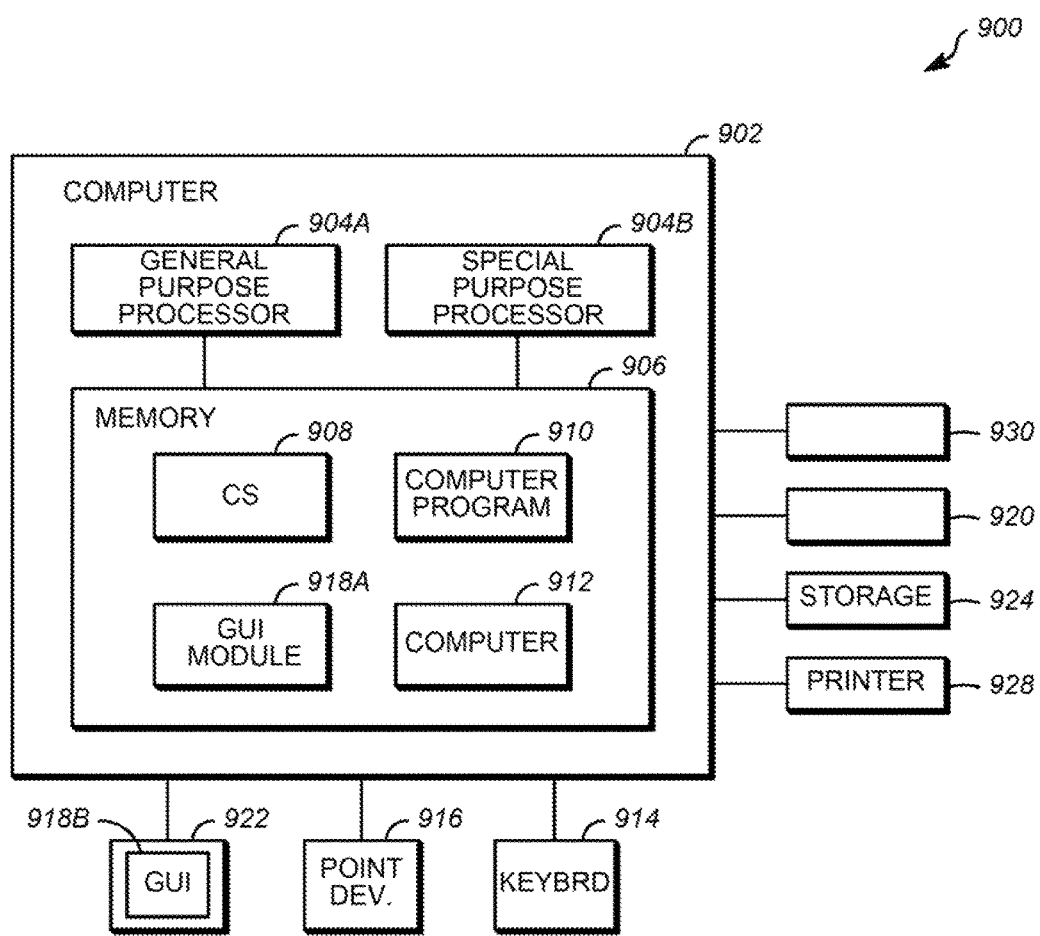
FIG. 9 is a diagram illustrating an exemplary computer system that could be used to implement elements of the distributed processing environment.

FIG. 9 is a diagram illustrating an exemplary computer system 100 that could be used to implement elements of the distributed processing environment 100, including the CA 110, CM 104, orchestrator 102 and/or cloud processor 108. The computer system 900 comprises a computer 902 comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of securely executing an application instance on a first processor for processing video, comprising:
   accepting a request in an orchestrator executing on a second processor to launch the application instance in the first processor for processing video;
   transmitting a command from the orchestrator to the first processor to launch the application instance; and
   provisioning a certificate and a private key from the orchestrator to the launched application instance executing on the second processor, the certificate and private key securing protected information of the application instance, wherein the private key is encrypted according to a key encryption key securely stored in an application image of the application instance;
   wherein the first processor decrypts the private key according to the key encryption key and re-encrypts the private key according to a local storage key;
   wherein the first processor executes the application instance on the first processor using the decrypted private key and the certificate;
   wherein the key encryption key is unique to a type of the application; and
   wherein provisioning the certificate and the private key from the orchestrator to the launched application instance executing on the second processor comprises:
      transmitting a certificate request to a certificate manager, the certificate request comprising a unique identifier of the application instance and a template;
      receiving a certificate response from the certificate manager, the certificate response comprising the certificate and the private key encrypted according to the key encryption key; and
      provisioning the certificate and the private key to the first processor.

2. The method of claim 1, wherein the unique identifier is assigned by the second processor after launching the application.

3. The method of claim 1, wherein the template describes validity period of the certificate and a function of the certificate, the function selected from a group comprising an encryption operation and a decryption operation.

4. The method of claim 1, wherein certificate manager executes on a third processor.

5. The method of claim 1, wherein the key encryption key is securely stored in the certificate manager prior to the orchestrator transmitting the command to launch the application instance in the first processor.

6. The method of claim 1, further comprising:
   storing the private key encrypted with the local encryption key and the certificate in secure storage local to the first processor.

7. The method of claim 6, wherein the local storage key is generated by the first processor at least in part from the key encryption key and the unique identifier of the application instance.

8. The method of claim 7, wherein the local storage key is generated at least in part by:
   generating a hash of the unique identifier of the application instance; and
   decrypting the hashed unique identifier of the application instance with the key encryption key to generate the local storage key.

9. The method of claim 1, wherein the certificate manager:
   composes a second certificate request having the unique identifier of the application instance and the template;
   transmits the second certificate request to a certificate authority; and
   receives the certificate having the private key from the certificate authority.

10. A system for securely enabling execution of an application instance on a first processor for processing video signals, the application instance having information encrypted according to a private key, the system comprising:
   an orchestrator, executing on a second processor having a second processor memory, the second processor memory having second processor instructions comprising instructions for:
      accepting a request to launch the application instance;
      transmitting a command to the first processor for processing video to launch the application instance;
      directly provisioning a certificate and the private key to the launched application instance executing on the first processor, wherein the provisioned private key is encrypted according to a key encryption key securely stored in an application image of the application instance,
   wherein the first processor executes the application instance on the first processor using the decrypted private key and the certificate;

wherein the key encryption key is unique to a type of the application; and wherein the second processor instructions for provisioning the certificate and the private key to the launched application instance executing on the second processor comprises second processor instructions for:

transmitting a certificate request to a certificate manager, the certificate request comprising a unique identifier of the application instance and a template;

receiving a certificate response from the certificate manager, the certificate response comprising the certificate and the private key encrypted according to the key encryption key; and provisioning the certificate and the private key to the first processor.

11. The system of claim 10, wherein the template describes validity period of the certificate and a function of the certificate, the function selected from a group comprising an encryption operation and a decryption operation.

12. The system of claim 10, wherein the system further comprises:

the certificate manager, executing on a third processor having a third processor memory, the third processor memory having third processor instructions comprising instructions for:

composing a second certificate request having the unique identifier of the application instance and the template;

transmitting the second certificate request to an on-demand certificate authority; and receiving the certificate having the private key from the certificate authority.

13. The system of claim 10, wherein the first processor is communicatively coupled to a first processor memory having first processor instructions comprising instructions for:

encrypting the private key with a local storage key; and storing the private key encrypted with the local encryption key and the certificate in secure storage local to the first processor.

14. The system of claim 10, wherein the local storage key is generated by the first processor at least in part from the key encryption key and the unique identifier of the application instance.

* * * * *